(12) United States Patent
Aimura et al.

(10) Patent No.: US 8,174,578 B2
(45) Date of Patent: May 8, 2012

(54) VEHICLE PERIPHERY MONITORING DEVICE

(75) Inventors: Makoto Aimura, Saitama (JP); Masakazu Saka, Saitama (JP); Hiroshi Hattori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/003,044

(22) PCT Filed: May 19, 2009

(86) PCT No.: PCT/JP2009/002191
§ 371 (c)(1),
(2), (4) Date: Jan. 7, 2011

(87) PCT Pub. No.: WO2010/007718
PCT Pub. Date: Jan. 21, 2010

(65) Prior Publication Data
US 2011/0109739 A1    May 12, 2011

(30) Foreign Application Priority Data

Jul. 15, 2008  (JP) ................................. 2008-184180

(51) Int. Cl.
*H04N 7/18*   (2006.01)

(52) U.S. Cl. .......................... 348/148; 348/135; 382/104

(58) Field of Classification Search .................. 348/148, 348/135; 382/104, 135; *H04N 7/18*
See application file for complete search history.

(56) References Cited

U.S. PATENT DOCUMENTS

2008/0130954 A1 *  6/2008  Taniguchi et al. ............ 382/104

FOREIGN PATENT DOCUMENTS

| JP | 07-050825 A | 2/1995 |
| JP | 2002-312769 A | 10/2002 |
| JP | 2004-295798 A | 10/2004 |
| JP | 2007-310705 A | 11/2007 |
| JP | 2008-021035 | 1/2008 |

* cited by examiner

*Primary Examiner* — Jay Patel
*Assistant Examiner* — James Pontius
(74) *Attorney, Agent, or Firm* — Carrier Blackman & Associates, P.C.; Joseph P. Carrier; William D. Blackman

(57) ABSTRACT

A vehicle periphery monitoring device is operable to recognize with high accuracy whether or not an object is a designated quadruped animal. According to the vehicle periphery monitoring device, for determining whether or not a first object region and a second object region correspond to the designated quadruped animal according to whether or not the aspect ratio of the first object region is equal to or greater 1, a plurality of the second object regions are extracted, and it is determined whether the ratio of the vertical dimension of the second object region to the vertical dimension of the first object region lies within the range of the ratio of the leg vertical dimension to the torso vertical dimension of a common designated quadruped animal.

4 Claims, 8 Drawing Sheets

VEHICLE PERIPHERY MONITORING DEVICE

PRIORITY CLAIM

The present application is based on and claims the priority benefit of Japanese Patent Application 2008-184180 filed on Jul. 15, 2008, the contents of which are incorporated herein by reference in its entirety.

BACKGROUND OF THE INVENTION

1. Field of the Invention

The present invention relates to a vehicle periphery monitoring device configured to monitor the periphery of a vehicle through the usage of a captured image acquired by an imaging device mounted in the vehicle.

2. Description of the Related Art

Hitherto, there has been known an art which extracts an image region of an object from a captured image, and reports to the driver a determination that the classification of the object is an animal other than a human being when a first object region with a ratio of dimensions in different directions within a predefined range and a plurality of second object regions which are located below the first object region and have smaller surface area than the first object region are contained in the extracted image region of the object (refer to Japanese Patent Laid-open No. 2007-310705).

However, the object extracted from the captured image acquired by the imaging device mounted in the vehicle is not limited to a human being or an animal but also includes an artificial structure such as another vehicle or the like. Thus, when the plurality of second object regions below the first object region are contained in the extracted image region of the object, the classification of the object is determined to be an animal other than a human being; however, it is possible that the artificial structure such as another vehicle or the like is also included into the classification. Thereby, when the artificial structure such as another vehicle or the like is recognized by the self vehicle as an animal other than a human being, the presence thereof would be reported to the driver in vain. In addition, an animal to be determined by the self vehicle as an animal other than a human being is especially a large animal such as a deer or the like with four legs (designated quadruped animal).

SUMMARY OF THE INVENTION

The present invention has been accomplished in view of the aforementioned problems, and it is therefore an object of the present invention to provide a vehicle periphery monitoring device capable of recognizing with high accuracy whether or not an object is a designated quadruped animal.

To attain an object described above according to the present invention, a first aspect of the present invention provides a vehicle periphery monitoring device configured to monitor the periphery of a vehicle by using a captured image acquired by an imaging device mounted in the vehicle. The vehicle periphery monitoring device of the present invention comprises: a first object region extraction unit configured to extract a first object region from the captured image; a second object region extraction unit configured to extract a second object region below the first object region extracted by the first object region extraction unit; an object aspect ratio measurement unit configured to measure the aspect ratio of the lateral dimension with respect to the vertical dimension of the first object region extracted by the first object region extraction unit; and an animal determination unit configured to determine whether or not the first object region and the second object region correspond to a designated quadruped animal according to whether or not the aspect ratio measured by the object aspect ratio measurement unit is equal to or greater 1, a plurality of the second object regions are extracted and the ratio of the vertical dimension of the second object region extracted by the second object region extraction unit with respect to the vertical dimension of the first object region extracted by the first object region extraction unit lies within the range of the ratio of the leg vertical dimension to the torso vertical dimension of a common designated quadruped animal.

According to the vehicle periphery monitoring device of the present invention, whether or not the first object region and the second object region correspond to a designated quadruped animal is determined according to whether or not the aspect ratio of the first object region is equal to or greater 1, a plurality of the second object regions are extracted and the ratio of the vertical dimension of the second object region extracted by the second object region extraction unit with respect to the vertical dimension of the first object region extracted within the range of the ratio of the leg vertical dimension to the torso vertical dimension of a common designated quadruped animal. By taking into consideration that the aspect ratio of the torso is equal to or greater than 1, the ratio of the torso vertical dimension with respect to the leg vertical dimension lies within a predefined range, and the legs thereof are plural and present in bilateral or anteroposterior direction when a designated quadruped animal is viewed in profile, whether or not the object is a quadruped animal can be recognized with high accuracy by the mentioned determination approach.

It is acceptable that the second object region extraction unit sets a lower region including the first object region as an assumptive region and extracts the second object region from the assumptive region.

According to the vehicle periphery monitoring device of the mentioned configuration, a lower region including the first object region is set as the assumptive region and the second object region is extracted from the assumptive region. By taking into consideration that the upper end portion of the leg of a designated quadruped animal is positioned below the torso, whether or not the object is a quadruped animal can be recognized with high accuracy by the mentioned determination approach.

It is acceptable that the second object region extraction unit extracts the second object region from the assumptive region of a dimension equal to or greater than a dimension of the first object region.

According to the vehicle periphery monitoring device of the mentioned configuration, the second object region is extracted from the assumptive region of a dimension equal to or greater than a dimension of the first object region. By taking into consideration that the legs of a designated quadruped animal are located at the front end portion and the rear end portion in the lateral direction of the torso, whether or not the object is a quadruped animal can be recognized with high accuracy by the mentioned determination approach.

It is acceptable that the animal determination unit determines whether or not the first object region and the second object region correspond to the designated quadruped animal according to whether or not the ratio of a dimension of one second object region with respect to a dimension of another second object region among the plurality of second object regions lies within a predefined range.

According to the vehicle periphery monitoring device of the mentioned configuration, the designated quadruped animal is determined according to whether or not the ratio of a dimension of one second object region with respect to a dimension of another second object region among the plurality of second object regions lies within the predefined range. By taking into consideration that the ratio of legs of a designated quadruped animal in the bilateral direction or legs thereof in the anteroposterior direction lies within the predefined range, whether or not the object is a quadruped animal can be recognized with high accuracy by the mentioned determination approach.

It is acceptable that the animal determination unit determines whether or not the first object region and the second object region correspond to the designated quadruped animal according to whether or not the number of the second object region is no less than 2 but no more than 4.

According to the vehicle periphery monitoring device of the mentioned configuration, by taking into consideration that the number of legs of a designated quadruped animal is 4 and it is rarely possible that the 4 legs are viewed as one, whether or not the object is a quadruped animal can be recognized with high accuracy by the mentioned determination approach.

DETAILED DESCRIPTION OF THE PREFERRED EMBODIMENTS

An embodiment of a vehicle periphery monitoring device according to the present invention will be described hereinafter.

Figure 1:
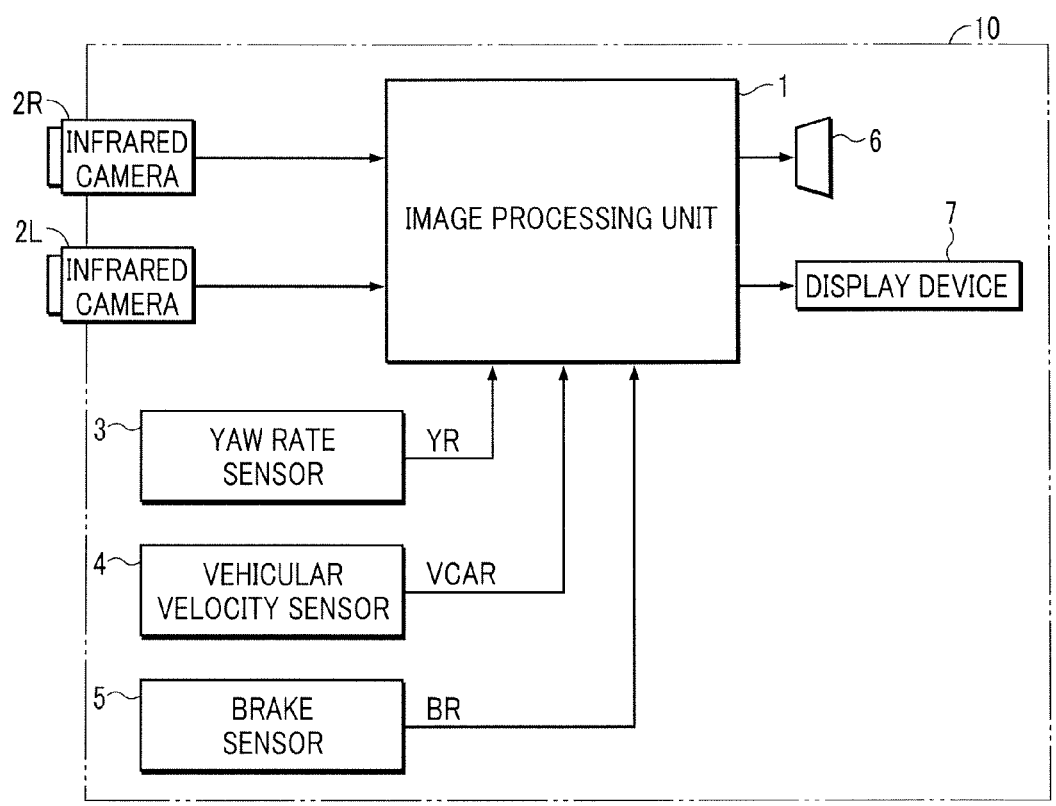
FIG. 1 is a view of an overall configuration of a vehicle periphery monitoring device according to an embodiment of the present invention.
Figure 2:
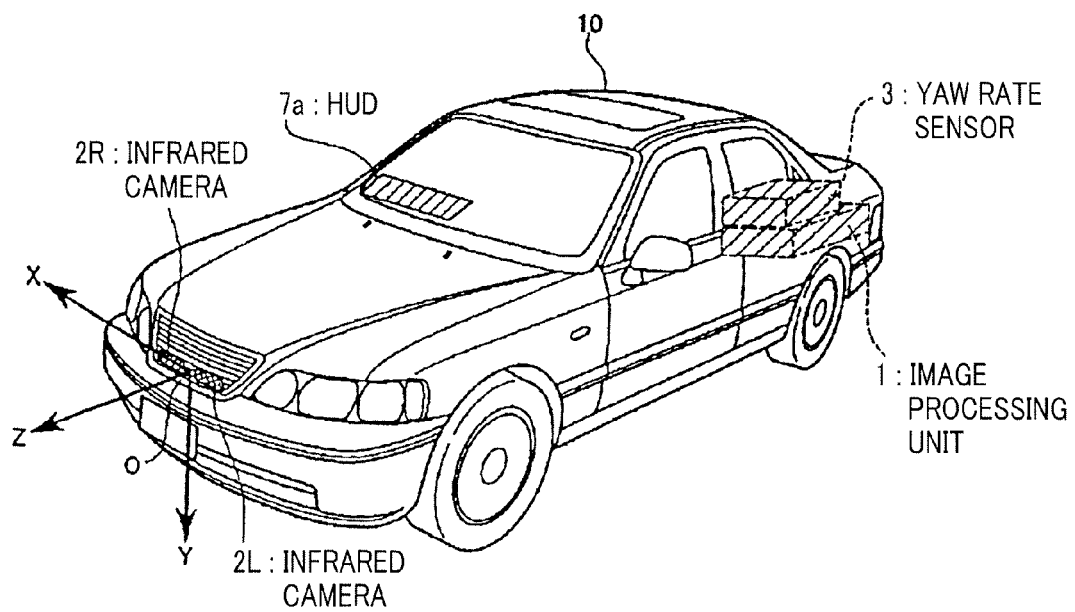
FIG. 2 is an explanatory view of a vehicle mounted with the vehicle periphery monitoring device.

First, the configuration of the vehicle periphery monitoring device of the present embodiment will be described. The vehicle periphery monitoring device illustrated in FIG. 1 and FIG. 2 is provided with an image processing unit 1. The image processing unit 1 is connected with imaging devices, namely two infrared cameras 2R and 2L for capturing an image in front of a self vehicle 10, and sensors for detecting the travelling state of the self vehicle 10, namely a yaw rate sensor 3 for detecting the yaw rate of the self vehicle 10, a vehicular velocity sensor 4 for detecting the travelling velocity (vehicular velocity) of the self vehicle 10 and a brake sensor 5 for detecting the operation of a brake of the self vehicle 10. Further, the image processing unit 1 is connected with a speaker 6 for outputting auditory report information via audible voices or the like, and a display device 7 for displaying the captured image by the infrared cameras 2R and 2L or visual report information. The two infrared cameras 2R and 2L correspond to the imaging device of the present invention.

Although not specifically illustrated in the drawings, the image processing unit 1 is composed of electronic circuits including an A/D conversion circuit, a micro computer (having a CPU, a RAM, a ROM and the like), an image memory and the like. The analog signals output from the infrared cameras 2R and 2L, the yaw rate sensor 3, the vehicular velocity sensor 4 and the brake sensor 5 are digitalized by the A/D conversion circuit and the digitalized signals are input into the micro computer. On the basis of the input signals, the micro computer detects an object such as a human being (a pedestrian, a human being riding on a bicycle) or the like, and executes a process for reporting the presence of the object to the driver via the speaker 6 or the display device 7 when the detected object satisfies a predefined report condition. The image processing unit 1 functions as a first object extraction unit, a second object extraction unit, an object aspect ratio measurement unit, a comparison unit and an animal determination unit in the present invention.

As illustrated in FIG. 2, in order to photograph the front image of the self vehicle 10, the two infrared cameras 2R and 2L are disposed at a front portion (at the front grill in the drawing) of the self vehicle 10. The infrared camera 2R and the infrared camera 2L are disposed closer to the right side and closer to the left side rather than to the center point in the width direction of the self vehicle 10, respectively. The two cameras 2R and 2L are disposed symmetrical with respect to the central line in the width direction of the self vehicle 10. The infrared cameras 2R and 2L are fixed in such a way that the optical axes thereof are parallel to each other in the anteroposterior direction of the self vehicle 10 and the vertical dimension from the road surface to the optical axis of one camera is equal to the other. The infrared cameras 2R and 2L have sensitivity in the far infrared region, therefore, have a property of outputting image signals with higher levels (the luminance of the image signals becomes greater) when the temperature of an object to be photographed becomes higher.

In the present embodiment, a head-up display 7a (hereinafter, referred to as HUD 7a) displaying image information on the windshield of the self vehicle 10 is adopted as the display device 7. In addition to the HUD 7a, a display built integrally with a meter for displaying the travel conditions such as the vehicular velocity or the like of the self vehicle 10, a display disposed in a vehicular navigation apparatus may be used as the display device 7.

Hereinafter, the basic functions of the vehicle periphery monitoring device with the aforementioned configurations will be described with reference to the flow chart illustrated in FIG. 3. The basic processing contents of the flow chart illustrated in FIG. 3 are identical to those illustrated in FIG. 3 of Japanese Patent Laid-open No. 2001-6096 and FIG. 3 of Japanese Patent Laid-open No. 2007-310705 applied by the present applicants.

Figure 3:
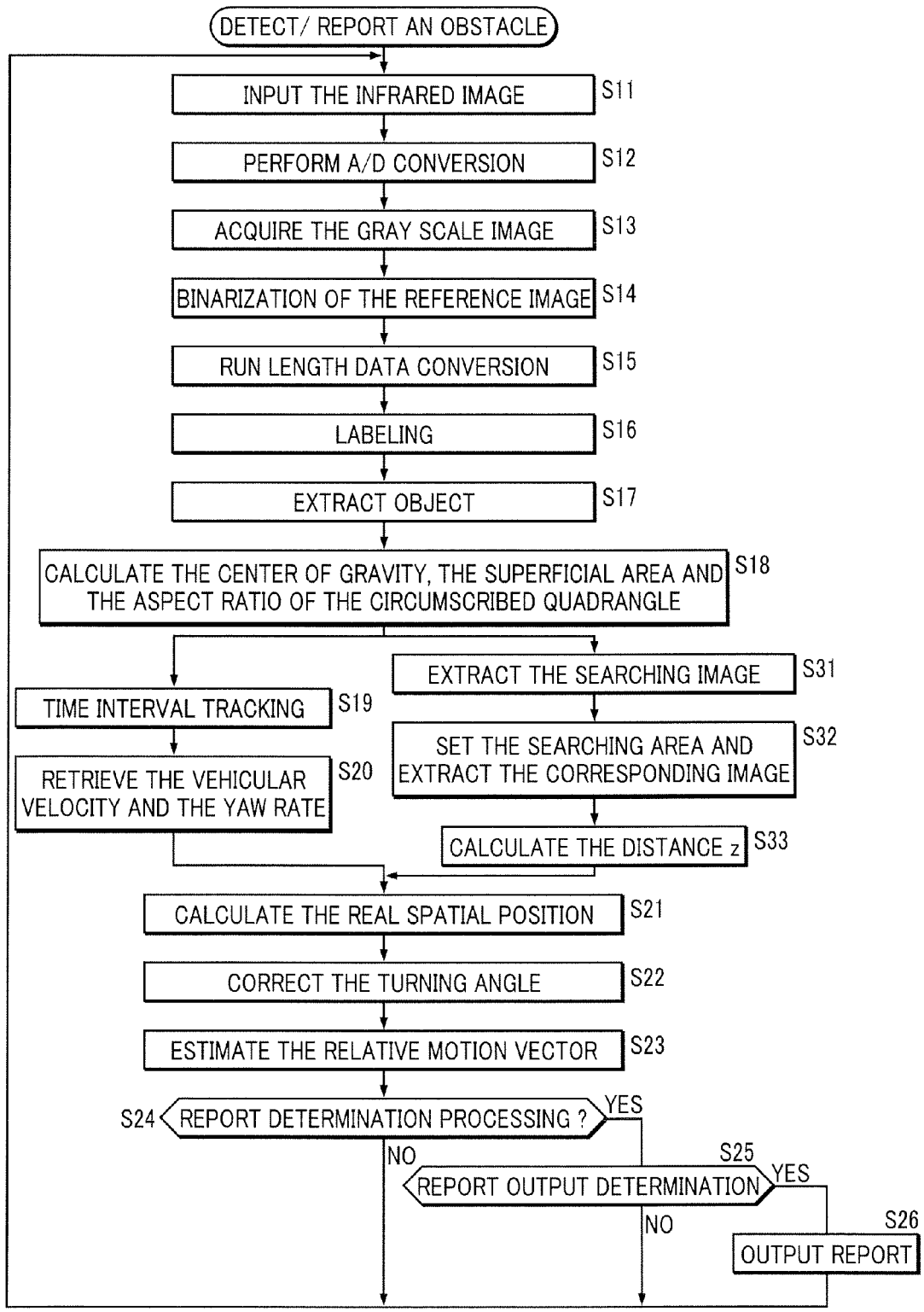
FIG. 3 is a flow chart illustrating a procedure performed by the vehicle periphery monitoring device.

Specifically, at first, the infrared image signals from the infrared cameras 2R and 2L are input into the image processing unit 1 (FIG. 3/STEP 11). Thereafter, the image processing unit 1 performs A/D conversion on the output signals from the infrared cameras 2R and 2L (FIG. 3/STEP 12). Then, the image processing unit 1 generates a gray scale image from the infrared image obtained from the A/D conversion (FIG. 3/STEP 13). Subsequently, the image processing unit 1 binarizes a reference image (right image) (FIG. 3/STEP 14). Then, the image processing unit 1 performs the process from STEP 15 to STEP 17 on the binarized image and extracts an object (more precisely, an image region corresponding to the object) from the binarized image. Specifically, the group of pixels constituting a high luminance region in the binarized image is converted to run length data (FIG. 3/STEP 15). Then, the lines in a group overlapped in the vertical direction of the reference image are tagged with a label (identifier), respectively (FIG. 3/STEP 16). Each of the line groups is extracted as an object (FIG. 3/STEP 17). Thereafter, the center of gravity (position in the reference image) of each object extracted as described in the above, the superficial area and the aspect ratio of the circumscribed quadrangle are calculated (FIG. 3/STEP 18). Subsequently, the image processing unit 1 performs a time interval tracking process on the object extracted at STEP 18, in other words, performs recognition of the identical object every arithmetic computation cycle of the image processing unit 1 (FIG. 3/STEP 19). Thereafter, the image processing unit 1 retrieves the outputs from the vehicular velocity sensor 4 and the yaw rate sensor 5 (the detection value of the vehicular velocity and the detection value of the yaw rate) (FIG. 3/STEP 20).

Meanwhile, in parallel to the calculation of the aspect ratio of the circumscribed quadrangle and the time interval tracking of the object, the image processing unit 1 extracts a region (for example, the region of a quadrangle circumscribing the object) corresponding to each object in the reference image as a searching image (FIG. 3/STEP 31). Then, a searching region is set in the left image for searching an image (corresponding image) corresponding to the searching image and a correlation computation is performed thereon to extract the corresponding image (FIG. 3/STEP 32). Thereafter, a distance from the self vehicle 10 to the object (in the anteroposterior direction of the self vehicle 10) is calculated (FIG. 3/STEP 33).

Then, the image processing unit 1 calculates the real spatial position which is the position of each object (relative to the self vehicle 10) in real space (refer to FIG. 3/STEP 21). Thereafter, the image processing unit 1 corrects the position X of the real spatial position (X, Y, Z) of the object in the X direction according to the turning angle data in time series obtained at STEP 20 (FIG. 3/STEP 22). Then, the image processing unit 1 estimates a relative motion vector of the object with respect to the self vehicle 10 (FIG. 3/STEP 23). After the relative motion vector is obtained at STEP 23, the level of contact possibility between the detected object is determined and a report determination processing which gives out a report at the time when the level of contact possibility is high is performed (FIG. 3/STEP 24). When it is determined that the object satisfies a report determination condition (FIG. 3/STEP 24 . . . YES), a report output determination processing is performed to determine whether or not a report related to the object satisfying the report determination condition should be actually given out (FIG. 3/STEP 25). When it is determined that the report should be given out (FIG. 3/STEP 25 . . . YES), the image processing unit 1 reports to the driver that the level of contact possibility between the self vehicle 10 and the object is high (FIG. 3/STEP 26). Specifically, the situation is reported by outputting voices via the speaker 6. The situation is also reported by highlighting the object on the HUD 7a. The overall operations of the vehicle periphery monitoring device of the present embodiment are described in the above. The configuration for performing the process from STEP 11 to STEP 18 by the image processing unit 1 corresponds to the first object region extraction unit of the present invention.

Hereinafter, the report determination processing at STEP 24 of the flow chart illustrated in FIG. 3 will be described with reference to the flow chart illustrated in FIG. 4. The basic processing contents of the flow chart illustrated in FIG. 4 are identical to those illustrated in FIG. 4 of Japanese Patent Laid-open No. 2001-6096 and FIG. 4 of Japanese Patent Laid-open No. 2007-310705 applied by the present applicants.

Figure 4:
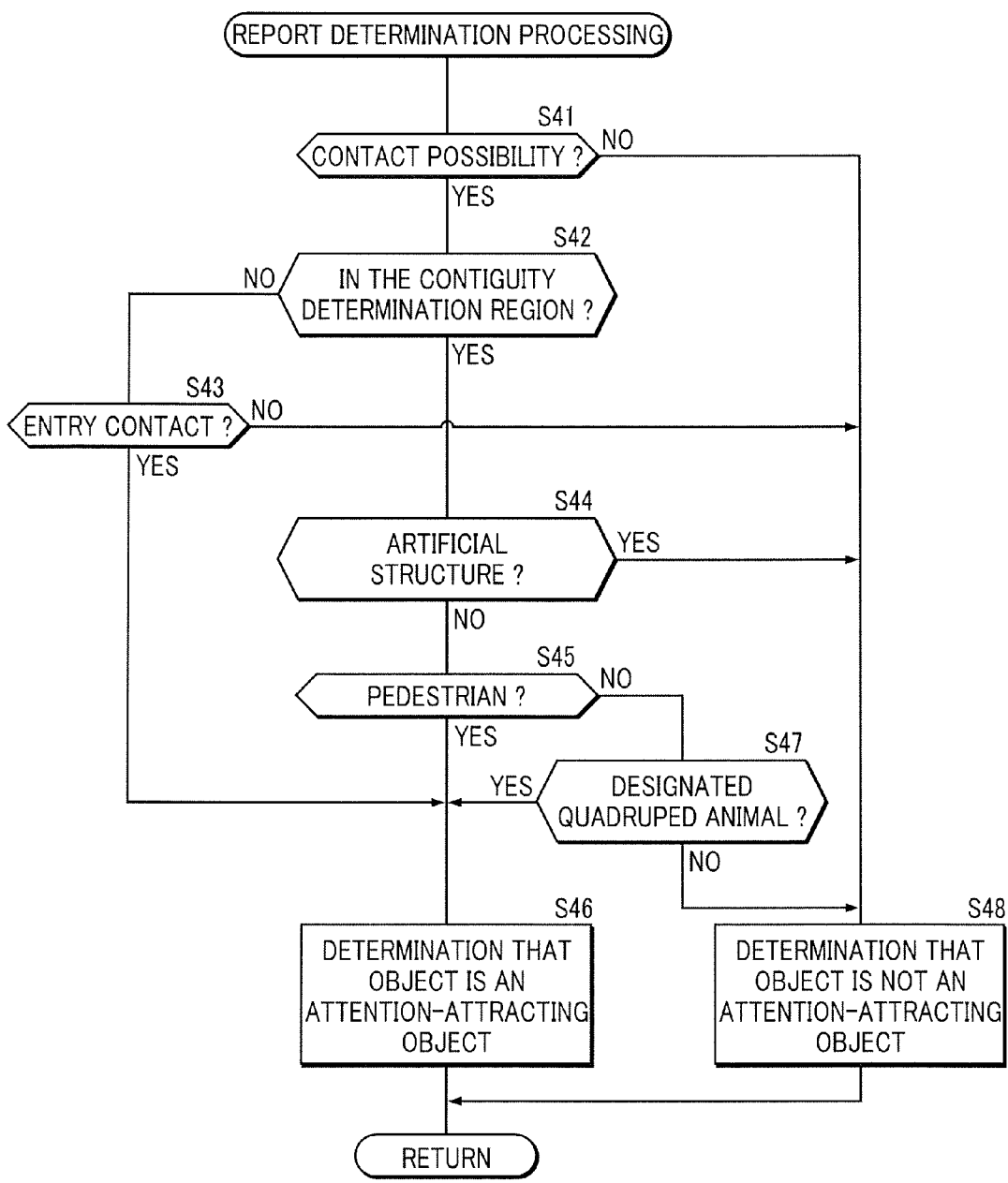
FIG. 4 is a flow chart illustrating a procedure performed by the vehicle periphery monitoring device.

Specifically, first, the image processing unit 1 performs a contact determination processing (FIG. 4/STEP 41). In the contact determination processing, when a distance between the self vehicle 10 and the object is no more than a multiplied value of the relative velocity Vs by a time interval T, the contact therebetween is determined to be possible. When the self vehicle and the object are possible to contact within the time interval T (FIG. 4/STEP 41 . . . YES), the image formation unit 1 determines whether or not the object is present in a contiguity determination region (FIG. 4/STEP 42). If the object is determined not to be present in the contiguity determination region (FIG. 4/STEP 42 . . . NO), the image formation unit 1 determines whether or not the object is possible to enter the contiguity determination region and have contact to the self vehicle 10 (FIG. 4/STEP 43). Specifically, when the object is present in the entry determination region and the motion vector of the object obtained at STEP 23 is pointing to the contiguity determination region, it is determined that the contact possibility is high.

On the other hand, when the object is determined to be present in the contiguity determination region (FIG. 4/STEP 42 . . . YES), the image processing unit 1 performs an artificial structure determination processing which determines whether or not the object is an artificial structure (FIG. 4/STEP 44). In the artificial structure determination processing, if the object is detected to have features impossible to be possessed by a pedestrian, the object is determined to be an artificial structure and will be excluded from being reported. When it is determined that the object is not an artificial structure (FIG. 4/STEP 44 . . . NO), whether or not the object is a pedestrian is determined (FIG. 4/STEP 45). Specifically, whether or not the object is a pedestrian is determined according to the characteristics such as the shape or size, the luminance distribution and the like of the object area of the object in the gray scale image.

When it is determined that the object is possible to enter the contiguity determination region and contact the self vehicle 10 (FIG. 4/STEP 43 . . . YES) and the object is a pedestrian (FIG. 4/STEP 45 . . . YES), the detected object is reported or is determined as an attention-attracting object (FIG. 4/STEP 46). On the other hand, if it is determined that the object is not a pedestrian (FIG. 4/STEP 45 . . . NO), the image processing unit 1 excludes the detected object from being reported (FIG. 4/STEP 48).

When it is determined that the object is not a pedestrian (FIG. 4/STEP 45 . . . NO), whether or not the object is a large animal with 4 legs (designated quadruped animal) is determined (FIG. 4/STEP 47). When it is determined that the object is a designated quadruped animal (FIG. 4/STEP 47 . . . YES), the image processing unit 1 determines the detected object as a report subject (FIG. 4/STEP 46). On the other hand, if it is determined that the object is not a designated quadruped animal (FIG. 4/STEP 47 . . . NO), the image processing unit 1 excludes the detected object from being reported as a report subject (FIG. 4/STEP 48).

Hereinafter, the object classification determination processing which is a major function of the vehicle periphery monitoring device of the present invention will be described with reference to the flow chart of FIG. 5.

Figure 5:
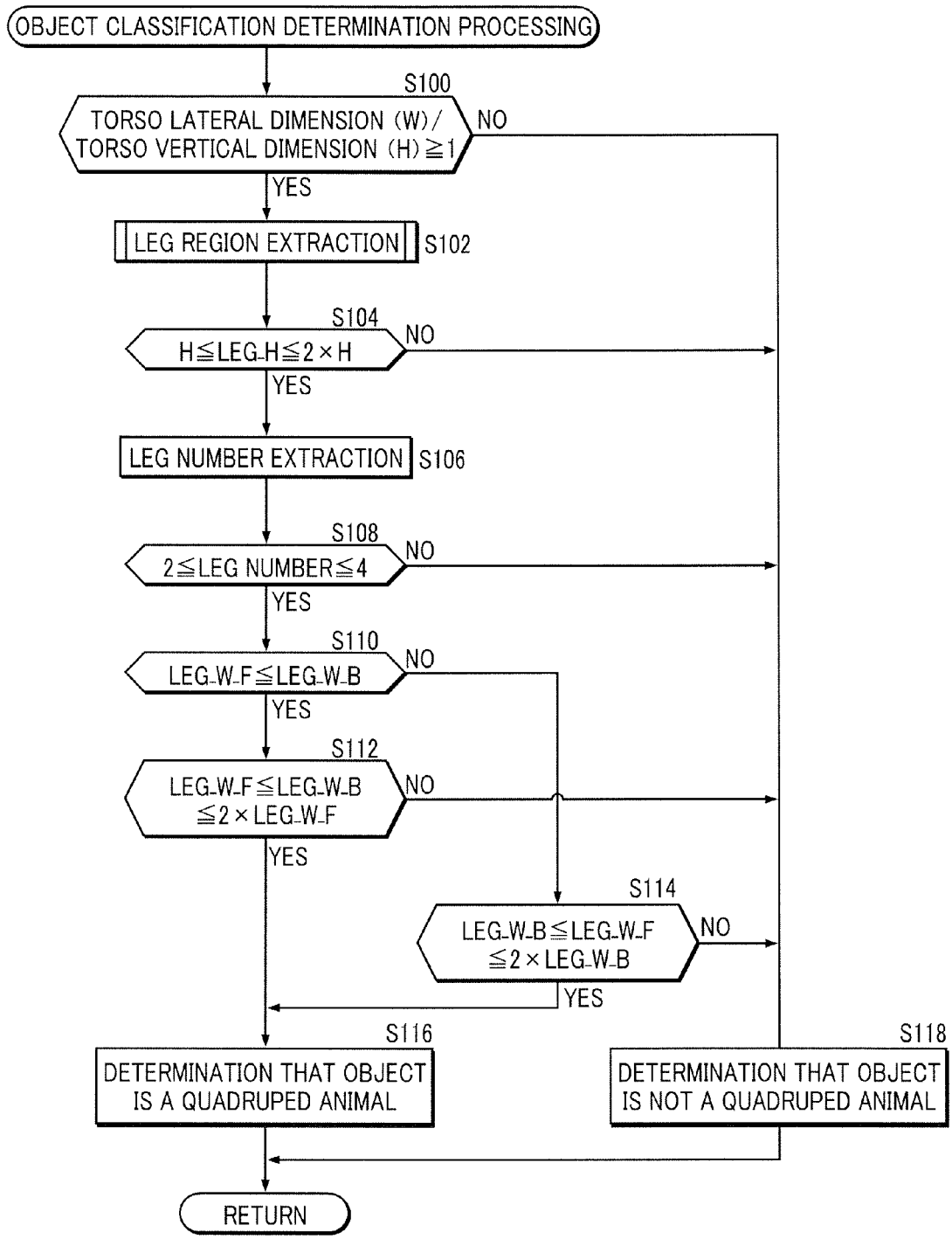
FIG. 5 is a flow chart illustrating a procedure of object classification determination processing.
Figure 7:
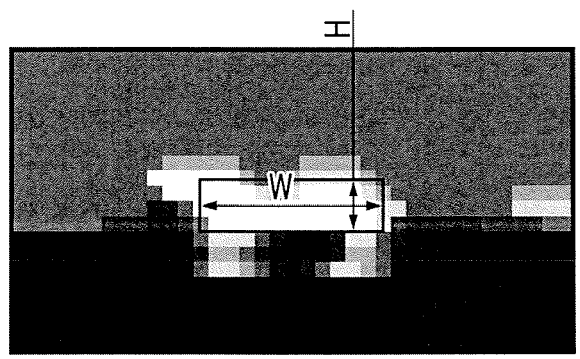
FIGS. 7(a)-7(c) are explanatory views illustrating an image processing method by an image processing unit.
Figure 7:
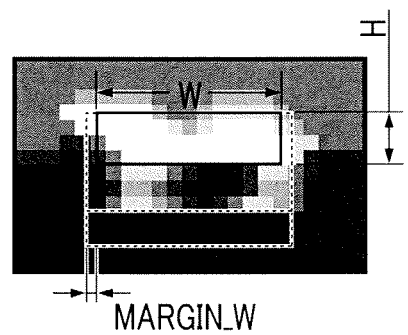
Figure 7:
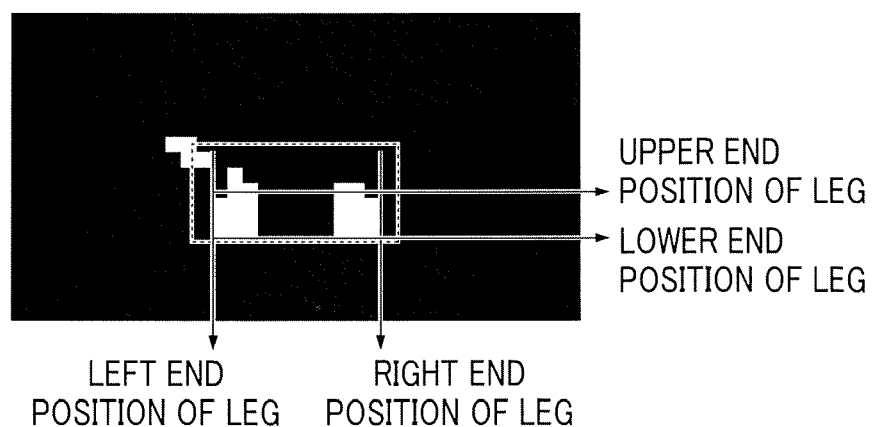

First, the aspect ratio of a first object region extracted by the first object extraction unit is equal to or greater than 1 is determined (FIG. 5/STEP 100). Specifically, as illustrated in FIG. 7(a), whether or not the aspect ratio of the first object region which is obtained by dividing the lateral dimension W of the first object region by the vertical dimension H thereof is equal to or greater than 1 is determined on the basis of the binarized image (refer to FIG. 3/STEP 14) obtained by binarizing the gray scale image (refer to FIG. 3/STEP 13) obtained by A/D converting the infrared image captured by the infrared cameras 2R and 2L. The first object region may correspond to the torso of the designated quadruped animal.

If the determination result is affirmative (FIG. 5/STEP 100 ... YES), a second object region below the first object region is extracted (FIG. 5/STEP 102). Specifically, a second object region extraction processing is performed according to the flow chart illustrated in FIG. 6. The second object region may correspond to the legs of the designated quadruped animal.

Figure 6:
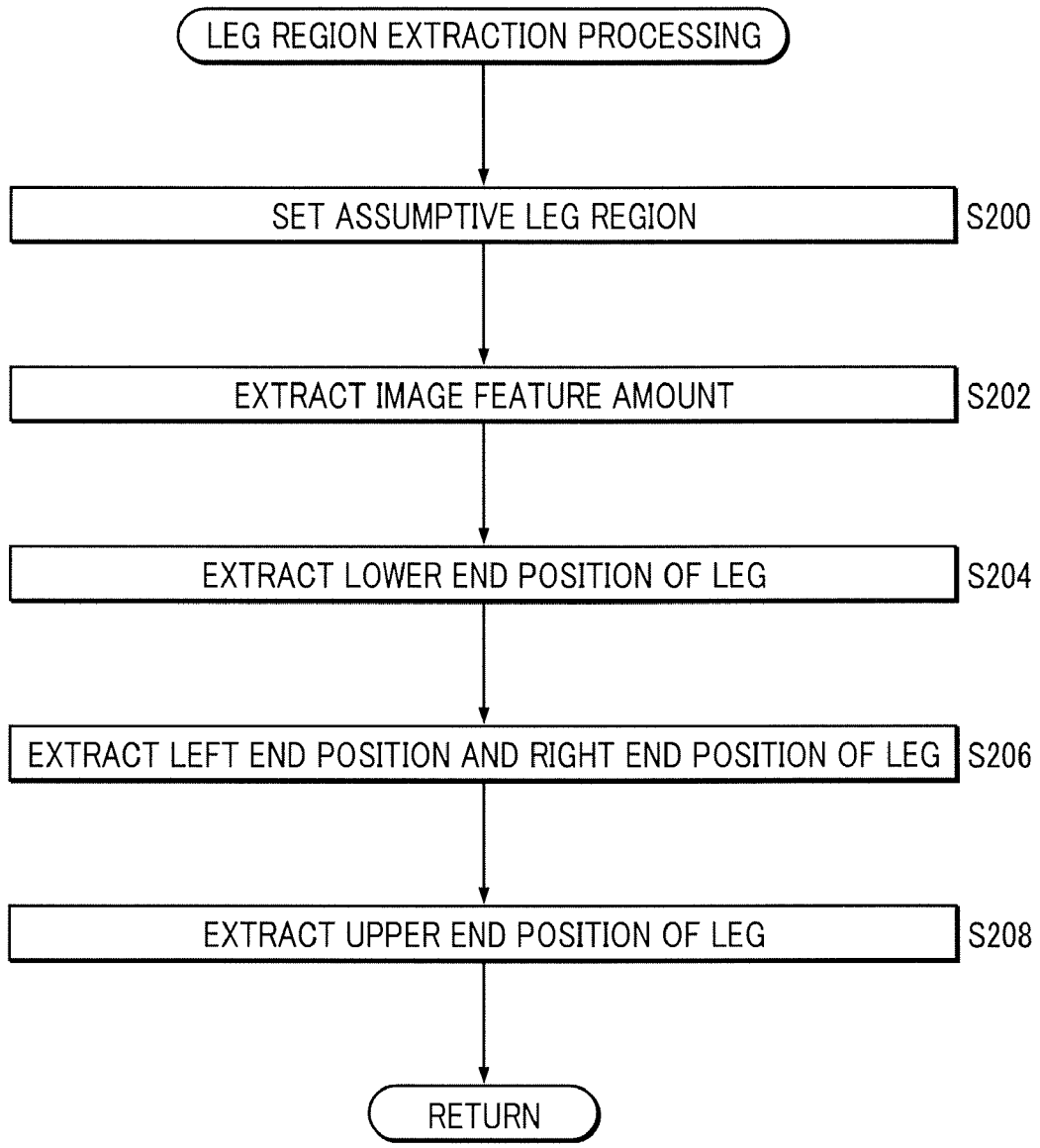
FIG. 6 is a flow chart illustrating a procedure of leg region extraction processing.

Firstly, an assumptive region is set below the first object region (FIG. 6/STEP 200). Specifically, as illustrated in FIG. 7(b), the vertical dimension of the assumptive region is three times as high as the vertical dimension H of the first object region. The lateral dimension of the assumptive region is equal to the lateral dimension W of the first object region with a margin (MARGIN_W) of a predefined length added to both lateral ends thereof. Regarding to the positional relationship in the vertical direction, the upper end of the assumptive region is positioned the same as the upper end of the first object region. However, it is acceptable that the upper end of the assumptive region is set lower than the upper end of the first object region. Regarding to the positional relationship in the lateral direction, the right end of the assumptive region is positioned at the right end of the margin (MARGIN_W) added to the lateral dimension W of the first object region, and the left end of the assumptive region is positioned at the left end of the margin (MARGIN_W) added to the lateral dimension W of the first object region. The legs of the designated quadruped animal may be present in the assumptive region.

The image luminance feature amount is extracted from the assumptive region (FIG. 6/STEP 200). Specifically, as illustrated in FIG. 7(c), vertical edges are extracted every vertical or lateral pixel from the assumptive region (enclosed by dotted lines).

The lower end position of the leg is extracted from the assumptive region (FIG. 6/STEP 202). Specifically, as illustrated in FIG. 7(c), the lower end position of the leg is extracted according to the pixel number of the vertical edges in the lateral direction. In addition, it is acceptable to extract the lower end position of the leg according to the variation on the pixel number of the vertical edge.

Thereafter, the left and the right end positions of the leg are extracted from the assumptive region (FIG. 6/STEP 204). Specifically, as illustrated in FIG. 7(c), the left and the right end positions of the leg are extracted according to the pixel number of the vertical edges in the vertical direction. In addition, it is acceptable to extract the left and the right end positions of the leg according to the continuity of the vertical edges.

Subsequently, the upper end position of the leg is extracted from the assumptive region (FIG. 6/STEP 206). Specifically, as illustrated in FIG. 7(c), the upper end position of the leg is extracted according to the pixel number of the vertical edges in the lateral direction. In addition, it is acceptable to extract the upper end position of the leg according to the variation on the pixel number of the vertical edges.

Then, returning back to FIG. 5, whether or not the vertical dimension LEG_H of the second object region extracted at STEP 102 satisfies the relational expression of H≦LEG_H≦2*H is determined (FIG. 5/STEP 104). Specifically, as illustrated in FIG. 8(a), the vertical dimension LEG_H of the second object region is compared with the vertical dimension H of the first object region when the first object region and the second object region satisfies the positional relationship in the vertical direction that the lower end position of the torso matches the upper end position of the leg.

When the determination result is affirmative (FIG. 5/STEP 104 ... YES), as illustrated in the flow chart of FIG. 6, a second object region extraction processing is performed to extract the number of the second object regions from the assumptive region by using the image luminance feature amount (FIG. 5/STEP 106). Specifically, the number of the second object regions present in the assumptive region is extracted according to the variation amount of the vertical edges of the assumptive region in the lateral direction. For example, as illustrated in FIG. 8(b), two second object regions, that is, a second object region LEG_F (LEG_W_F (lateral dimension of the front second object region)) and a second object region LEG_B (LEG_W_B (lateral dimension of the back second object region)) are extracted.

Whether or not the number of the second object regions extracted from the assumptive region is no less than 2 but no more than 4 is determined (FIG. 5/STEP 108). For a designated quadruped animal, the number of legs is 4; however, sometimes the legs in the front overlap with each other and so do the legs in the back, making the number of legs to be viewed as 2.

Thereafter, the lateral dimension of the front second object region (LEG_W_F) and the lateral dimension of the back second object region (LEG_W_B), which are extracted from the assumptive region, are compared (FIG. 5/STEP 110).

When it is determined that LEG_W_F≦LEG_W_B holds (FIG. 5/STEP 110 ... YES), whether or not LEG_W_F LEG_W_B≦2*LEG_W_F holds is determined (FIG. 5/STEP 112).

When the determination result is affirmative (FIG. 5/STEP 112 ... YES), it is determined that the first object region and the second object region correspond to the designated quadruped animal (FIG. 5/STEP 116). On the other hand, if the determination result is negative (FIG. 5/STEP 112 ... NO), it is determined that the object region does not correspond to the designated quadruped animal (FIG. 5/STEP 118).

On the other hand, if it is determined that LEG_W_F LEG_W_B does not hold (FIG. 5/STEP 110 ... NO), whether or not LEG_W_B≦LEG_W_F≦2*LEG_W_B holds is determined (FIG. 5/STEP 114).

When the determination result is affirmative (FIG. 5/STEP 114 ... YES), it is determined that the object region corresponds to the designated quadruped animal (FIG. 5/STEP 116). On the other hand, if the determination result is negative (FIG. 5/STEP 114 ... NO), it is determined that the object region does not correspond to the designated quadruped animal (FIG. 5/STEP 118).

Note that the number of the second object regions described at STEP 110 to STEP 114 is 2, but it is not limited thereto. For example, when the number is 4, the lateral dimension of either one is compared with the lateral dimensions of the other three. It is acceptable that the second object regions closer in the lateral direction of the image are joined together and the two joined second object regions are compared with each other. Similarly, it is acceptable that when the number is 3, the second object regions closer in the lateral direction of the image are joined together and the joined second object region is compared with the third one.

The configuration for performing the processing of STEP 100 by the image processing unit 1 corresponds to the object aspect ratio measurement unit of the present invention. The configuration for performing the processing of STEP 102 by the image processing unit 1 corresponds to the second object region extraction unit of the present invention. The configuration for performing the object classification determination processing (STEP 100 to STEP 108, STEP 200 to STEP 208) by the image processing unit 1 corresponds to the animal determination unit of the present invention.

Figure 8:
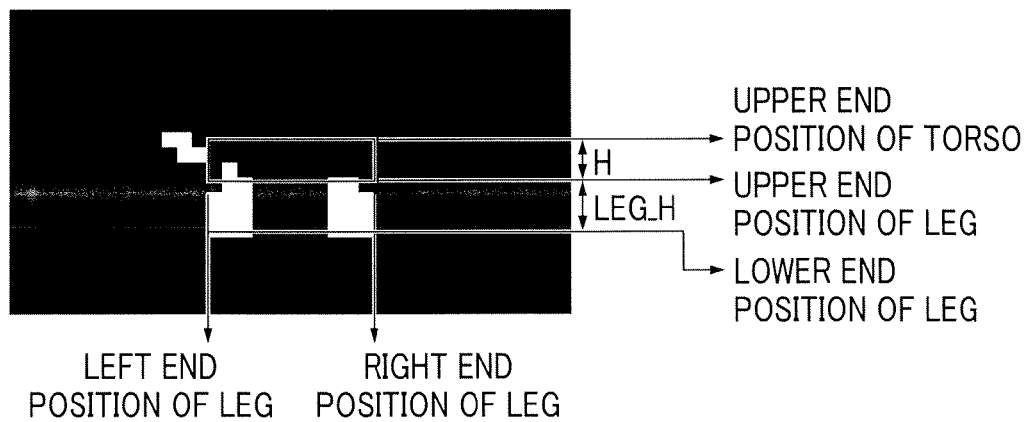
FIGS. 8(a)-8(c) are explanatory views illustrating an image processing method by an image processing unit.
Figure 8:
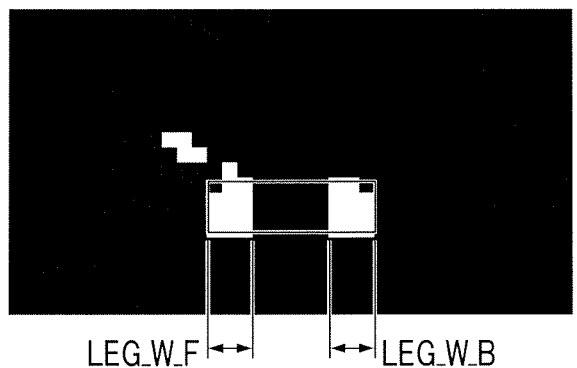

According to the vehicle periphery monitoring device with the above-mentioned functions, whether or not the first object region and the second object region correspond to a designated quadruped animal is determined according to whether or not the aspect ratio of the first object region is equal to or greater 1, a plurality of the second object regions are extracted and the ratio of the vertical dimension of the second object region with respect to the vertical dimension of the first object region lies within the range of the ratio of the leg vertical dimension to the torso vertical dimension of a common designated quadruped animal (refer to STEP 100 to STEP 108 and FIG. 8(*a*)). By taking into consideration that the aspect ratio of the torso is equal to or greater than 1, the ratio of the torso vertical dimension with respect to the leg vertical dimension lies within a predefined range, and the legs thereof are plural and present in bilateral or anteroposterior direction when a designated quadruped animal is viewed in profile, whether or not the object is a designated quadruped animal can be recognized with high accuracy by the mentioned determination approach.

In the present embodiment, the lateral dimension and the vertical dimension of the high luminance region are compared by using the vertical edges as the image luminance feature amount; however, it is acceptable to extract a luminance profile or the like and extract the high luminance region according to the luminance variation amount. It is also acceptable to use a length calculated from the position of the object in real space (refer to FIG. 3/STEP 21).

In the present embodiment, it is configured to give out the predefined report according to the processing result of the image processing unit 1; however, it is also acceptable to control the vehicle's behavior according to the processing result. In the aforementioned embodiment, the self vehicle 10 is mounted with two infrared cameras 2R and 2L; it is also acceptable to mount one infrared camera thereon. In this case, the distance to the object is determined by radar or the like.

What is claimed is:

1. A vehicle periphery monitoring device configured to monitor the periphery of a vehicle, comprising:
   an imaging device mounted in the vehicle configured to acquire a captured image; and
   an image processing unit comprising electronic circuits configured to:
   extract a first object region from the captured image;
   extract a plurality of second object regions below the first object region;
   measure a lateral-to-vertical aspect ratio of a lateral dimension of the first object region with respect to a vertical dimension of the first object; and
   determine that the first object region and the second object region correspond to a designated quadruped animal based on:
   the lateral-to-vertical aspect ratio being equal to or greater than 1, and
   a vertical-to-vertical aspect ratio of a vertical dimension of each of the second object regions with respect to the vertical dimension of the first object region corresponding to a known ratio of a vertical dimension of a leg of the designated quadruped animal with respect to a vertical dimension of a torso of the designated quadruped animal.

2. The vehicle periphery monitoring device according to claim 1, wherein the image processing unit is further configured to set a lower region including the first object region as an assumptive region and extracts the second object region from the assumptive region.

3. The vehicle periphery monitoring device according to claim 2, wherein the image processing unit is further configured to extract the second object region from the assumptive region of a dimension equal to or greater than a dimension of the first object region.

4. The vehicle periphery monitoring device according to claim 1,
   wherein the plurality of second object regions includes at least a front second object and a back second object therein;
   wherein the image processing unit is further configured to measure a lateral-to-lateral aspect ratio of a lateral dimension of the front second object to a lateral dimension of the back second object; and
   wherein the determination that the first object region and the second object region correspond to a designated quadruped animal is further based on the lateral-to-lateral aspect ratio corresponding to a predefined range.

* * * * *